United States Patent
Lee et al.

(10) Patent No.: US 10,303,686 B2
(45) Date of Patent: May 28, 2019

(54) QUERY PLAN OPTIMIZATION BY PERSISTING A HINT TABLE

(71) Applicant: SAP SE, Walldorf (DE)

(72) Inventors: Jane Jung Lee, Seoul (KR); Taehyung Lee, Seoul (KR); Jiyoung Yoo, Seoul (KR); Sung Heun Wi, Gyeonggi-do (KR); Ki Hong Kim, Seoul (KR)

(73) Assignee: SAP SE, Walldorf (DE)

( * ) Notice: Subject to any disclaimer, the term of this patent is extended or adjusted under 35 U.S.C. 154(b) by 575 days.

(21) Appl. No.: 14/946,745

(22) Filed: Nov. 19, 2015

(65) Prior Publication Data

US 2017/0147639 A1     May 25, 2017

(51) Int. Cl.
  *G06F 16/00*    (2019.01)
  *G06F 16/2453*  (2019.01)
  *G06F 17/30*    (2006.01)

(52) U.S. Cl.
  CPC .. *G06F 16/24542* (2019.01); *G06F 16/24539* (2019.01); *G06F 17/30463* (2013.01)

(58) Field of Classification Search
  CPC ................................ G06F 17/30424–17/30551
  See application file for complete search history.

(56) References Cited

U.S. PATENT DOCUMENTS

| | | | | | |
|---|---|---|---|---|---|
| 5,367,675 | A | * | 11/1994 | Cheng | G06F 17/30451 |
| 5,548,770 | A | * | 8/1996 | Bridges | G06F 17/30445 |
| 5,742,810 | A | * | 4/1998 | Ng | G06F 17/30415 |
| 5,812,996 | A | * | 9/1998 | Rubin | G06F 12/0866 |
| 6,108,648 | A | * | 8/2000 | Lakshmi | G06F 17/30469 |
| 6,356,887 | B1 | * | 3/2002 | Berenson | G06F 17/30433 |
| 6,694,306 | B1 | * | 2/2004 | Nishizawa | G06F 17/30457 707/714 |
| 9,336,272 | B1 | * | 5/2016 | Thombre | G06F 17/30442 |
| 2006/0224563 | A1 | * | 10/2006 | Hanson | G06F 17/30463 |

\* cited by examiner

*Primary Examiner* — Robert W Beausoliel, Jr.
*Assistant Examiner* — Nirav K Khakhar
(74) *Attorney, Agent, or Firm* — Mintz Levin Cohn Ferris Glovsky and Popeo, P.C.

(57) ABSTRACT

In one aspect there is a method. The method may include associating a query received from an application with a hint, wherein the hint modifies an execution of the query. The method may further include an optimizer to compile the query according to the hint to produce a second query plan. When no hint is associated with the query, the optimizer may produce a first query plan. The method may further include storing the hint in a persistent table to enable state preservation during a database restart or binary upgrade, and/or executing the query using the second query plan.

13 Claims, 8 Drawing Sheets

QUERY PLAN OPTIMIZATION BY PERSISTING A HINT TABLE

The subject matter described herein relates to optimizing query plans using hints.

BACKGROUND

Data flow graphs comprise a plurality of nodes that define how a query is to be executed. For a given data flow graph and its nodes, rules can be used to decide various aspects of how the query is applied in an underlying database of a multi-level database management system. Applications that access the database generally provide higher level instructions that are converted to a query language such as SQL by a calculation engine or other intervening semantic layer of the database management system. The plurality of rules are generally applied globally and therefore may not provide the most optimized query plan for a specific query or set of queries generated by an application.

SUMMARY

Methods, systems, and computer readable media are disclosed. In one aspect there is a method. The method may include associating a query received from an application with a hint, wherein the hint modifies an execution plan of the query. The method may further include an optimizer to compile the query according to the hint to produce a second query plan. When no hint is associated with the query, the optimizer may produce a first query plan. The method may further include storing the hint in a persistent table to enable state preservation during a database restart or binary upgrade, and/or executing the query using the second query plan.

In some variations, one or more of the features disclosed herein including the following features can optionally be included in any feasible combination. The second query plan may be stored in a query plan cache. The second query plan may replace the first query plan in the query plan cache. The query plan cache may enable a query plan to be executed again without recompiling. A binding of the query to the hint may be stored in a hint table. The query may be decoupled from the database. The second query plan including the hint may be executed in less time than the first query plan.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from the description and drawings, and from the claims.

DETAILED DESCRIPTION

An application may require a database or table containing stored information. The application may execute a database query (or query) to retrieve information from the database or table. The query may be processed according to a query plan. When a query is received, an optimizer may compile the query to produce a query plan. Once the query plan is compiled, the query plan may be saved in a plan cache and may be used again for the same or similar query. In some example embodiments, the optimizer may determine if a hint is available when compiling the query plan. When a hint is available, the optimizer may use the hint to modify the query plan to change the execution of the query in accordance with the hint. For example, the time to execute the query may be reduced by including a hint in the query plan. The query plan including the hint may be stored and may replace a previous query plan in a query plan cache. The query and the hint may be stored in a hint table to bind the hint to the query.

In some example embodiments, hints may be stored in a persistent table which may be referred to as a hint table. The hint table may preserve state during a server restart, binary upgrade, software upgrade/update, hardware failure, machine shutdown, power failure, and/or database server crash. In some example embodiments, hints may be pinned to queries in a hint table to enable the reuse of hints during recompilation and/or cache hits.

Figure 1:
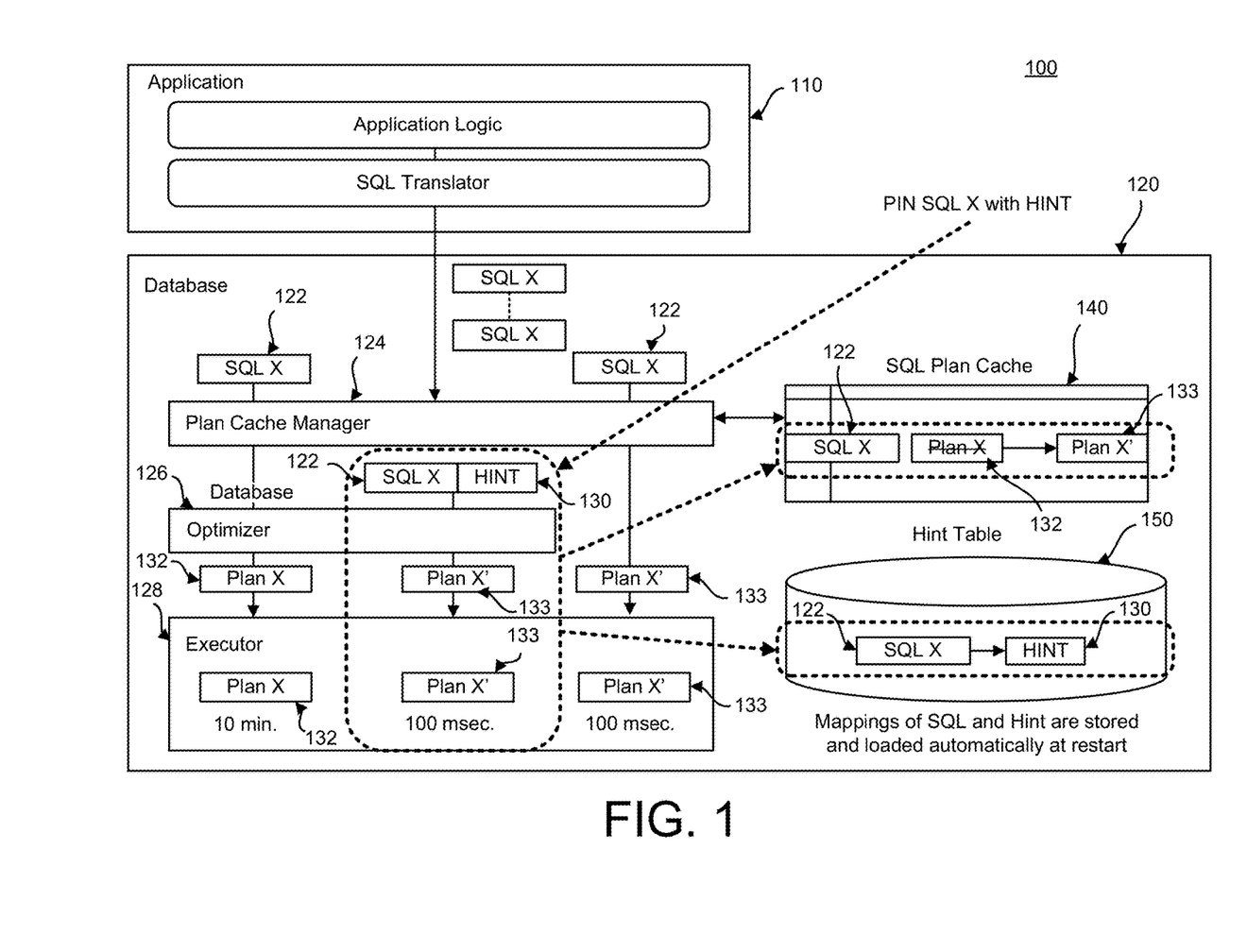
FIG. 1 depicts an application and a database, in accordance with some example embodiments.

FIG. 1 depicts an application and a database (or database server), in accordance with some example embodiments. Application 110 may issue a query for data and database 120 may respond to the query. Database 120 depicts three paths to responding to query 122. A first path may include using a query plan, query plan 132 (Plan X), that has been previously compiled by optimizer 126 (also referred to as query optimizer 126) and saved. For example, a compiled plan, such as query plan 132 (also referred to as plan 132), may be saved in a cache by SQL plan cache 140 (also referred to herein as plan cache 140). When the plan is saved to plan cache 140, it may later be retrieved and executed without requiring the plan to be recompiled. The execution of plan 132 has a time duration to process the query. In the example of FIG. 1, plan 132 may result in a 10-minute query processing time. A second path may be created by optimizer 126 when hint 130 is included with the query when it is compiled to generate a new plan 133 (Plan X'). In the example of FIG. 1, plan 133 may result in a 100 millisecond query processing time. A third path may include executing query 122 using plan 133 after plan 133 has been compiled and saved to plan cache 140. Plan 133 may be retrieved from plan cache 140 and executed without requiring recompiling. When database 120 executes query 122, it may do so using one of the foregoing three paths.

The first path for generating a response to query 122 may include optimizer 126 generating query plan 132 to execute the query. In some example embodiments, query plan 132 may be saved to plan cache 140 to execute the same or similar query in the future. The query plan 132 may be saved along with query 122 in plan cache 140. Executor 128 may execute plan 132 generated by optimizer 126, or after the query plan 132 has been compiled, executor 128 may retrieve query plan 132 from plan cache 140 and then execute the retrieved query plan 132. In the example on FIG. 1, query plan 132 may result in a 10-minute execution time.

The second path for generating a response to query 122 may include optimizer 126 generating query plan 133 that may include a hint with the query. In some example embodiments, optimizer 126 may be instructed to use hint 130. The hint 130 may change the query processing such as changing the query processing time. The optimizer 126 may generate query plan 133 based on query 122 and hint 130. Query plan 133 may be saved in plan cache 140. Later, query plan 133 may be retrieved from plan cache 140 in order to execute the same or similar query in the future. Query plan 133 may be saved along with query 122 in plan cache 140, and may update the plan cache by changing the query plan associated with query 122 from query plan 132 to query plan 133. Executor 128 may execute plan 133 generated by optimizer 126, or may execute query plan 133 retrieved from plan cache 140. In the example on FIG. 1, query plan 133 may result in a 100-millisecond execution time.

The third path for generating a response to query 122 may include optimizer 126 retrieving query plan 133 from plan cache 140. Query plan 133 may be previously generated and include a hint such as hint 130. Executor 128 may execute query plan 133 retrieved from plan cache 140. In the example of FIG. 1, query plan 133 may result in a 100-millisecond execution time.

Another example of a hint includes a hint that may provide data with a predetermined maximum elapsed time since the database was last updated, which may be referred to as a lag. For example, a lag of 10 minutes may mean that the database is updated every 10 minutes. Accordingly, data provided in response to a query may be last updated 10 minutes or less before the query. Other hints are also possible. Hereinafter, when a hint is used as an example, any other hint may be also used.

Plan cache 140 may provide storage for a query such as query 122 and compiled query plans such as query plans 132 and/or 133. When optimizer 126 compiles a query plan, the query plan may be stored in plan cache 140. For example, query plan 132 generated by optimizer 126 may be stored in plan cache 140. Stored query plans may be generated using hints. For example, optimizer 126 may compile query 122 including hint 130 to generate query plan 133. The compiled query plan including the hint may be stored in plan cache 140 as query plan 133. The query plan stored in plan cache 140 may be updated from query plan 132 to query plan 133. In some example embodiments, plan cache 140 may associate a query with a query plan. Multiple queries and query plans may be saved in plan cache 140. The query plans saved in plan cache 140 may be retrieved or loaded from plan cache 140 at a later time and the retrieved plan executed without recompiling. When a query is received by database 120, the plan cache 140 may be searched to match the query to a saved query plan that was previously compiled and stored. If a query plan that matches the query 122, the matching query plan may be retrieved. If no matching query plan is found, a query plan may be compiled and stored in plan cache 140.

Due to memory or storage limitations, plan cache 140 may become too large. If the plan cache 140 containing stored query plans exceeds a threshold size, one or more of the query plans may be discarded to make room for new query plans. Removing query plans from the plan cache may be referred to as eviction of the query plans. In some example embodiments, query plans that include one or more hints may not be evicted. For example, if the plan cache reached a threshold maximum size, then the query plan without the hint may be selected to be discarded to make space in the plan cache. In this way, query plans that include hints may be protected from eviction.

Hint table 150 may store bindings of queries to hints. For example, hint table 150 may store the binding of query 122 to hint 130. When a query that is mapped to a hint is compiled, the complied query plan may be stored in plan cache 140. For example, when query 122 is bound to hint 130, the compiled query plan 133 may be saved at plan cache 140. The hint table 150 may map a query to more than one hint which when compiled may result in a saved query plan. The hint table may preserve the state during database server restart, binary upgrade, software upgrade/update, and/or server crash. In some example embodiments, the hint table may be persisted to enable the reuse of hints during recompilation and/or cache hits after server restart. In some example embodiments, pinned hints are not discarded.

A hint table may bind a query to one or more hints to enable users and/or applications to replace an existing query plan stored in a plan cache with an updated query plan that is compiled to include the one or more hints. A hint may be appended to a query wherein the hint and query are compiled together. A query including a hint may provide a runtime mechanism to adapt queries that cannot be changed. For example, an application may include a query in the application code that cannot be changed. A hint may allow a user, administrator, or application to guide a query optimizer to produce query plans without changing the query statement. This may happen, for example, when the application is older and the database newer such that the newer database supports the query as requested by the application when the hint is included. In this example, in order to execute the query from the older application on the newer database, a hint may be bound to the query to adapt the query from the application to a query for the newer database. The foregoing is an example of how hints may adapt a query. Many other adaptions may also be performed to improve database performance times, prevent incorrect results and/or prevent system crash.

A hint table may be a persistent table whose state is maintained through database restart, database upgrade, and/or database crash. The hint table persistence ensures that binding between queries and hints persists through database restart, upgrade, and/or crash.

In some example embodiments, the binding between a query and hints may be broadcast to one or more servers. By broadcasting, future execution of the queries in the hint table will be caused to use the queries and hints in the table. In some example embodiments, upon broadcasting, if a cached plan does not exist for a broadcast query and hint, a compiled query plan including the hint may be saved to the plan cache of the corresponding server.

Figure 2:
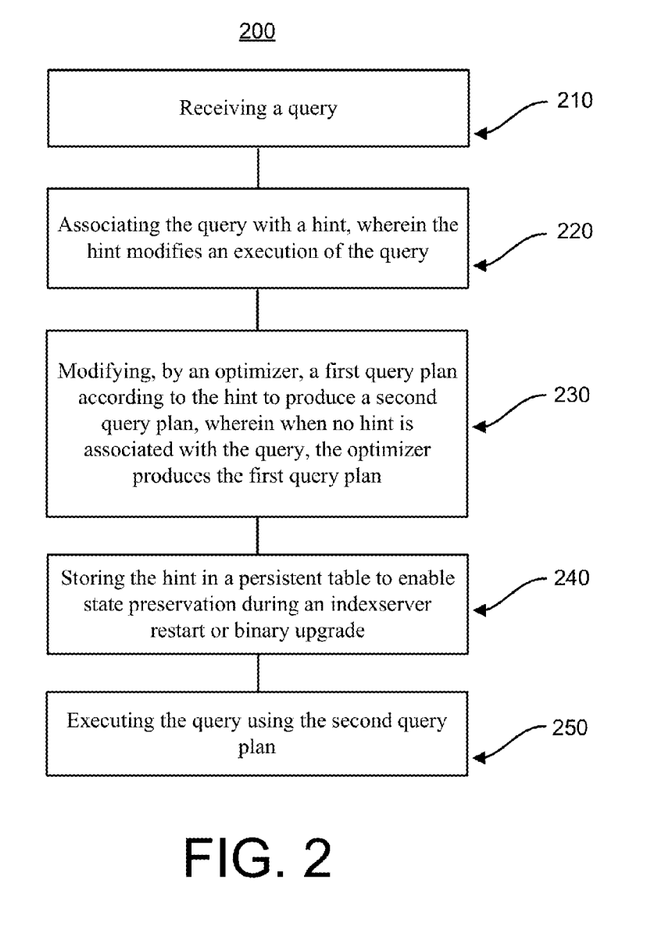
FIG. 2 depicts a process, in accordance with some example embodiments.

FIG. 2 depicts a process, in accordance with some example embodiments. At 210, a query may be received. At 220, the query may be associated with a hint. At 230, an optimizer may modify or compile a first query plan according to the hint to produce a second query plan. At 240, the query may be executed using the second query plan. The description of FIG. 2 also refers to FIG. 1.

At 210, a query may be received. For example, a query may be received from an application or application server such as application 110. The query may request data that may be stored in a database or a table within a database. In some example embodiments, the query may include a maximum value for a query processing time respond to the query. A user may also determine a maximum value for a query processing time. For example, query 122 may have a maximum allowable query processing time of 100 milliseconds. Continuing the previous example, when query 122 has a maximum allowable query processing time of 100 milliseconds, query plan 132 would not satisfy the processing time (because the processing time of query plan 132 is 10 minutes) but query plan 133 that includes hint 130 would.

At 220, the query may be associated with a hint. For example, if query 122 requires a query processing time of 10 minutes, then hint 130 may be incorporated into a query plan because query plan 132 having a processing time of 10 minutes meets the required processing time of 10 minutes. Note that query plan 133 having a processing time of 100 milliseconds could be used instead of query plan 132 because 100 milliseconds is less that the required processing time of 10 minutes. If query 122 requests a query processing time of 100 milliseconds, then hint 130 may be incorporated into a query plan such as query plan 133 in order to meet the processing time request. Accordingly, query plan 133 may be used but not 132. In some example embodiments, after a hint has been pinned, the plan including the pinned hint will be used for the query until the hint is unpinned. In some example embodiments, a query plan including a hint that satisfies the processing time may replace a query plan that does not.

At 230 a first query plan such as query plan 132 may be modified by optimizer 126 according to hint 130 to produce a second query plan, such as query plan 133. In the example of FIG. 1, hint 130 causes a query response time to change from 10 minutes to 100 milliseconds. Query plan 133 may be produced in response to query 122 including a 100 millisecond query response request or requirement. In some example embodiments, when no hint is associated with the query, the optimizer may produce a query plan without a hint such as query plan 132.

At 240, a hint may be stored in a persistent table such as a hint table 150. The hint table may include multiple entries of bindings between queries and hints. For example, hint table 150 may bind query 122 to hint 130. The hint table 150 may bind a query to more than one hint. The hint table may preserve the state during database server restart, binary upgrade, software upgrade/update, and/or server crash. In some example embodiments, the hint table may be persisted to enable the reuse of hints during recompilation and/or cache hits after server restart. At 250, the query may be executed according to the query plan including the hint.

Figure 3A:
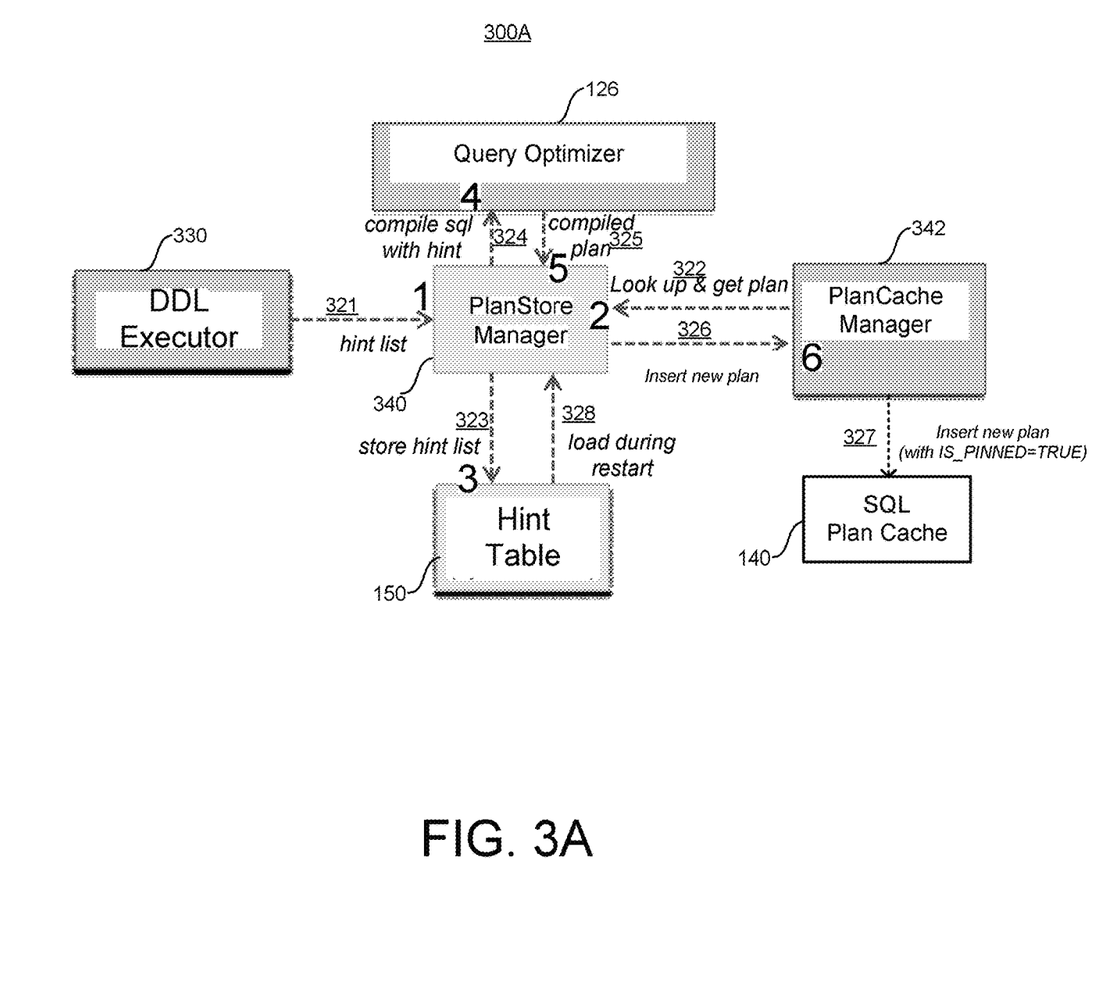
FIG. 3A depicts pinning a hint to a persistent table, in accordance with some example embodiments.
Figure 3B:
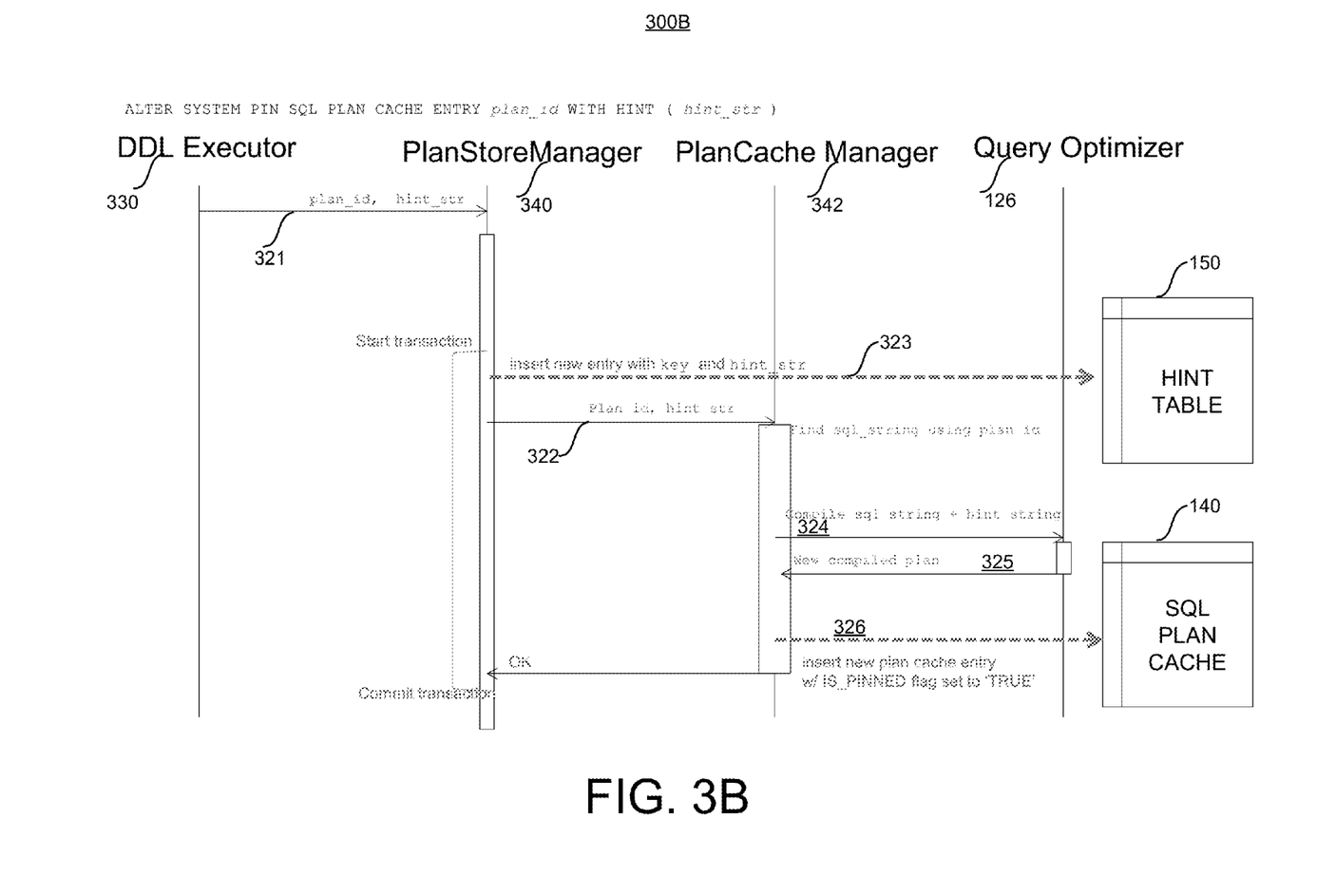
FIG. 3B depicts another view of pinning a hint to a persistent table, in accordance with some example embodiments.

FIGS. 3A and 3B depict different views of pinning a hint to a persistent table, in accordance with some example embodiments. Both FIGS. 3A and 3B show functional blocks and signaling between blocks to cause pinning of a hint. The description of FIGS. 3A and 3B also refer to FIGS. 1 and 2. The process depicted at 300A/300B causes a hint to be pinned to a query plan to allow the hint and query plan to be reused.

At 321, a user or an application may initiate pinning a hint to a query plan. Data definition language (DDL) executor 330 (also referred to herein as executor 330) may send to plan store manager 340 an identifier identifying the query plan and a hint string identifying the hint to be pinned to the query plan. For example, a hint string may include WITH HINT(NO_USE_OLAP_PLAN). In some example embodiments, at 322 the plan store manager 340 may request from plan cache manager 342 a query plan corresponding to the plan identifier and the hint string. Also at 322 the plan store manager may receive from plan cache manager 342 a query plan corresponding to the plan identifier and the hint string. A plan cache key may be provided with the query plan. In these ways, the plan store manager may look-up a compiled query plan and plan cache key using the plan identifier. The plan cache manager 342 may provide a query (also referred to as a query string) associated with the plan identifier. Plan store manager 340 may insert at 323 a new entry into hint table 150 based on the key and the hint string. In some example embodiments, at 324 plan store manager 340 may pass the query string and hint string to query optimizer 126 to compile the query string including the hint. Query optimizer 126 may compile the query string and hint string to produce a query plan and may provide the compiled query plan to plan store manager 340 at 325. At 326, plan store manager 340 may send a request to plan cache manager 342 to insert the compiled plan. At 327, plan cache manager 342 may insert the compiled plan in the SQL plan cache 140 and set Boolean variable "is-pinned" to true indicating that the query plan corresponding to the query string and hint string is pinned at SQL plan cache 140. In some example embodiments, a compiled query string and hint string producing an updated query plan may replace an earlier query plan in plan cache 140. In some example embodiments, once a query plan that includes a hint string is pinned to plan cache 140, it is not evicted from the plan cache when the cache memory becomes full. At 328, upon database restart, the queries and bound hints may be loaded into plan store manager 340. During database restart, the queries and bound hints may be recompiled by query optimizer 126 and stored again in SQL plan cache 140 through plan cache manager 342.

Figure 4A:
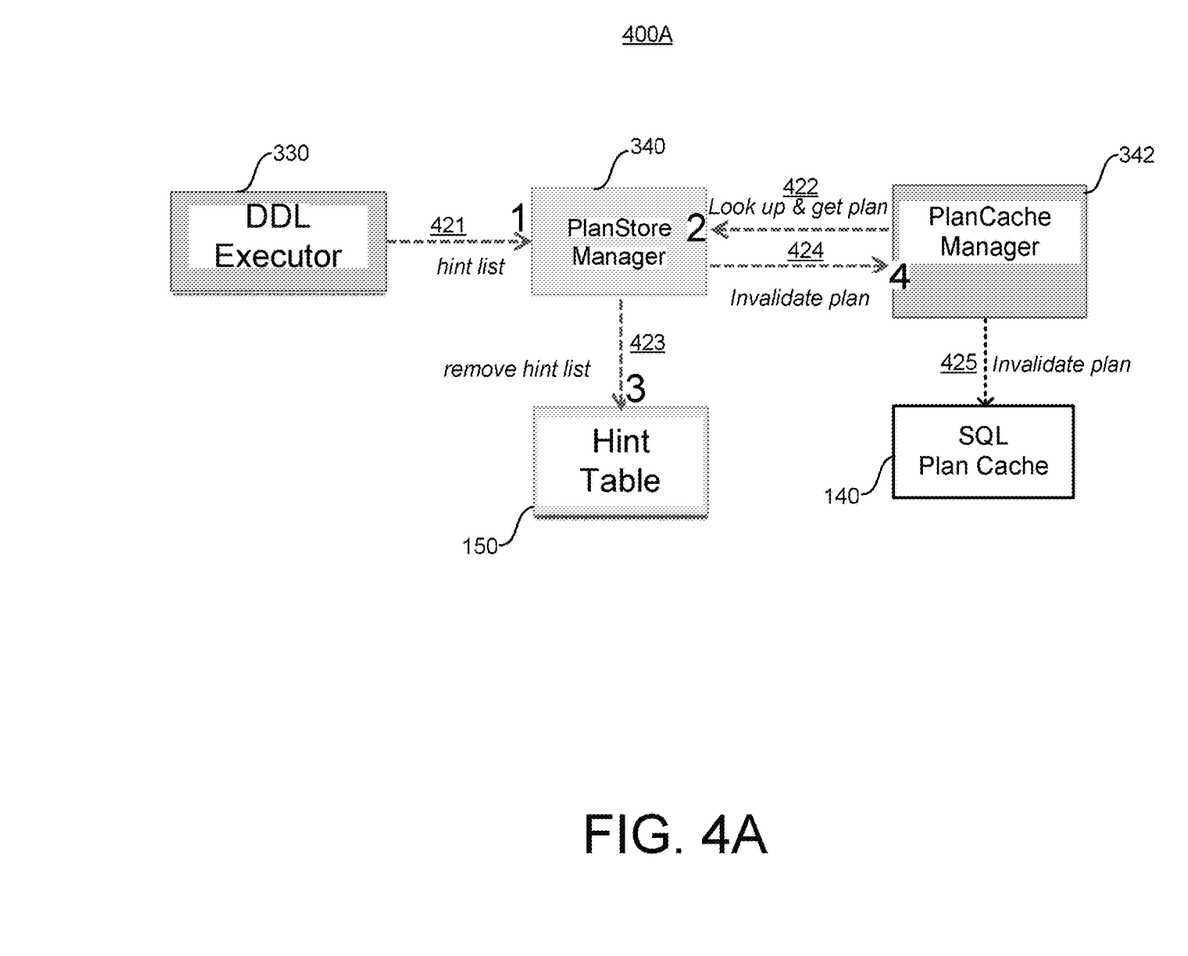
FIG. 4A depicts unpinning a hint from a persistent table, in accordance with some example embodiments.
Figure 4B:
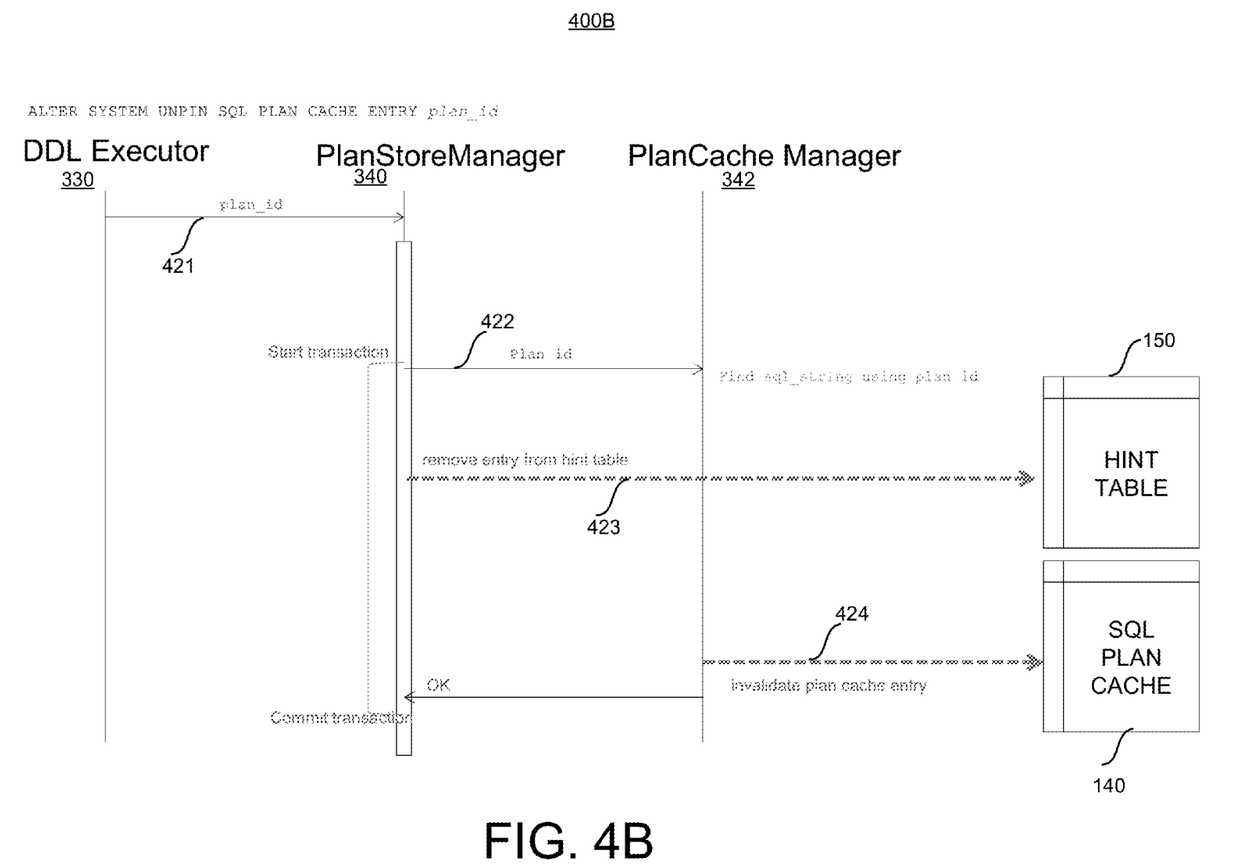
FIG. 4B depicts another view of unpinning a hint from a persistent table, in accordance with some example embodiments.

FIGS. 4A and 4B depict unpinning a hint from a persistent table, in accordance with some example embodiments. Both FIGS. 4A and 4B show functional blocks and signaling between blocks to cause unpinning a hint from a plan cache. The description of FIGS. 4A and 4B also refer to FIGS. 1 and 2. The process depicted at 400A/400B causes a hint to be unpinned from a query plan.

At 421, a user or an application may initiate unpinning a hint from a query plan. DDL executor 330 may send to plan store manager 340 at 421 an identifier identifying the query plan to be unpinned from the query plan. Also at 422 the plan cache manager 342 may provide to plan store manager 340 a query plan corresponding to the plan identifier. A plan cache key may be provided with the query plan. In these ways, the plan store manager 340 may look-up a compiled query plan and plan cache key using the plan identifier. At 423, the plan store manager 340 may look-up and remove an entry in the hint table corresponding to the retrieved plan cache key and/or query plan. At 424, the plan store manager 340 may send a request to cause the query plan corresponding to the query plan identifier to be invalidated at plan cache manager 342. At 425, plan cache manager 342 may invalidate an entry in the SQL plan cache 140 corresponding to the invalidated the query plan.

In some example embodiment, hints may be pinned and unpinned to a query using a system command that may be executed by an application or a user. Once pinned, the mapping of a query string to a hint may be stored in entries in a persistent table (hint table). During server restart due to a crash or system update, the hint table may be used to produce or reproduce the plan cache. Compiling entries in the hint table to produce a plan cache may preserve the state of the database from before the restart. After unpinning a hint from a query string, the corresponding query plan in the plan cache may become invalid. The binding of the query to the hint in the persistent table may also become invalid.

A hint applied to a query (or query string) may allow a query to be executed that could not be executed without the hint. For example, a query from a business warehouse may trigger a database crash due to a bug in an online analytical processing engine. In this example, a new release of the business warehouse application may be required to prevent the query from crashing the database. But a user or application may append a hint associated with the query to cause the execution of the query to proceed without causing a crash. For example, a hint table may bind the query to a hint that when executed together cause no crash to occur. Continuing the above example, the hint table may bind the query to the hint WITH HINT (NO_USE_OLAP_PLAN) which may avoid using the online analytical processing engine and thus prevent system crashes. The hint may be pinned to the query. The query plan including the hint may be compiled and saved in a plan cache. In this way, a query that would have caused a system crash may be executed according to a query plan that includes the hint and avoids crashing the system.

Figure 5:
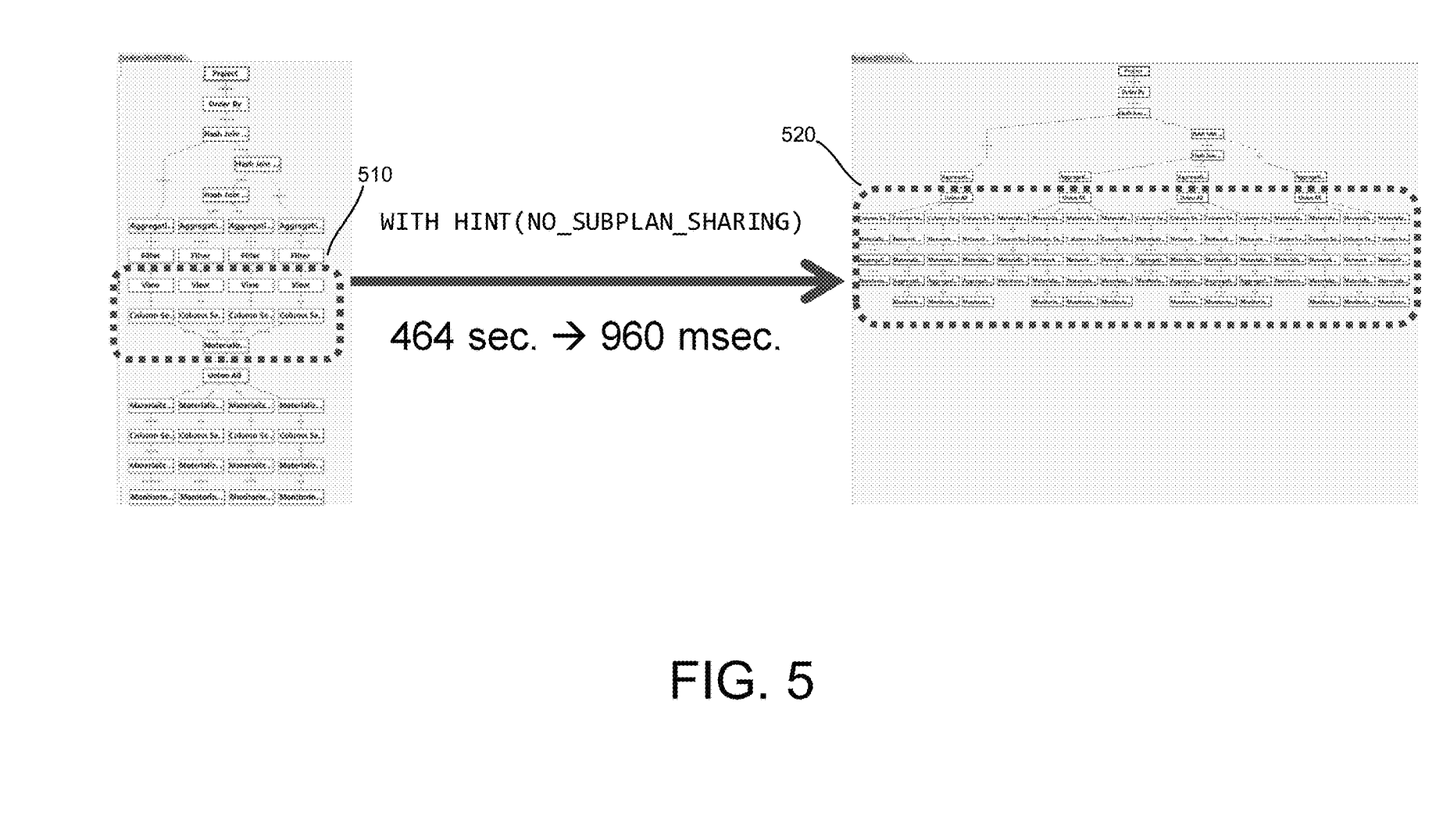
FIG. 5 depicts first query plan and second query plan generated using a hint, in accordance with some example embodiments.

FIG. 5 depicts a query plan including a hint, in accordance with some example embodiments. At 510, a query is shown when subplan sharing is used, and at 420 the query is shown when the hint disables subplan sharing. In this example, the SQL plan behavior may be changed by using the hint WITH HINT (NO_SUBPLAN_SHARING). The hint may be added to the query by postfixing "with hint ( )" to a query. Adding the hint to the SQL statement (query) may cause subplan 510 to be replicated at 520 rather than sharing the subplan. In this example, not sharing the subplan results in a query time that is much less than the query time if the subplan is shared. Appending the hint may affect execution of the SQL statement that includes the hint, and may not affect other SQL statements.

Hints may allow a user, database administrator, or application to change the compilation of a query. For example, the inclusion of hint 130 in the compilation of the query 122 may cause the query response time to change.

Figure 6:
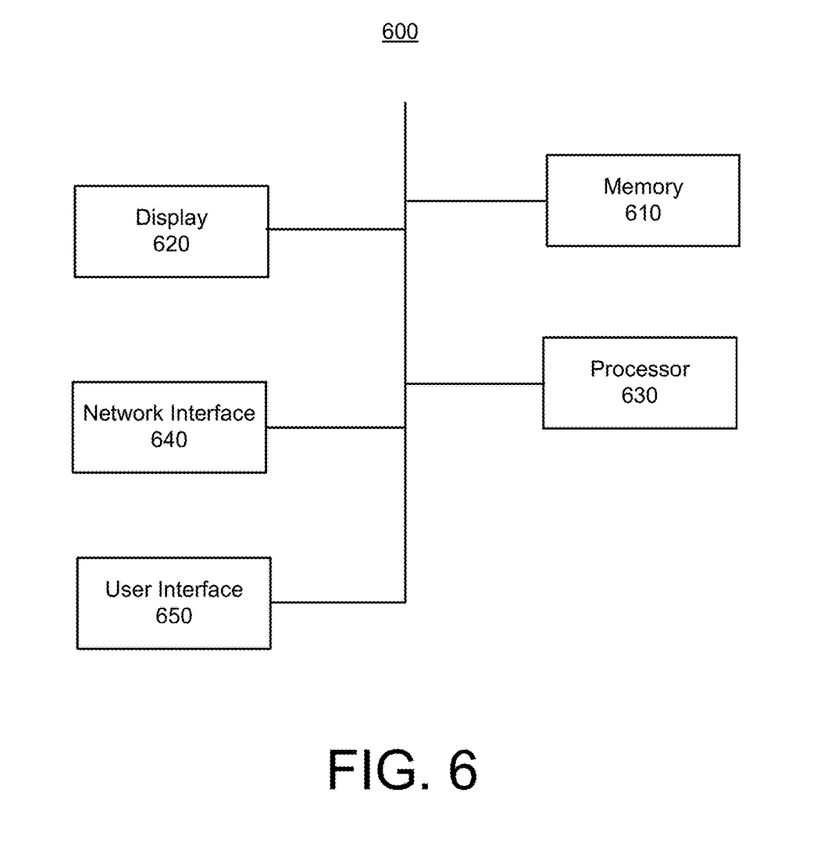
FIG. 6 depicts an apparatus including a database, in accordance with some example embodiments.

FIG. 6 depicts a computing apparatus 600, in accordance with some example embodiments. An apparatus consistent with FIG. 6 may implement application 110, and/or database 120 including cache manager 124, optimizer 126, executor 128, plan cache 140, and/or hint table 150. Computing apparatus 600 may perform the processes described with respect to any of FIGS. 1-5.

Computing apparatus 600 may include one or more processors such as processor 630 to execute instructions that may implement operations consistent with FIGS. 1-5. Apparatus 600 may include memory 610 to store executable instructions and/or information. Memory 610 may include solid-state memory, solid-state disk drives, magnetic disk drives, or any other information storage device. Memory 610 may provide storage for a database. Apparatus 600 may include a network interface 640 to a wired network or a wireless network. Wireless networks may include WiFi, WiMax, and cellular networks (2G/3G/4G/5G), and/or any other wireless network. Apparatus 600 may user interface 650 such as a keyboard, mouse, or other interface that may include a touchscreen integrated with display 620.

The disclosed subject matter has many advantages that provide workarounds that improve the correctness and performance of database queries. Problems with correctness may include incorrect rewrite rule application or incorrect logical transformation. Poor performance may include a poor plan due to insufficient statistics or imprecise size estimation, or insufficient information for a statement routing decision. The disclosed subject matter may provide workarounds that fix individual SQL statements with hints, and/or fix an application with a hint from a hint table without redeployment.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method, comprising:
   determining, by an optimizer, that a hint is available for a query received from an application, the hint modifying an execution time of the query at a database by at least reducing a quantity of time required to execute the query;
   in response to the determination that the hint is available for the query:
      compiling, by the optimizer, the query in accordance with the hint to generate a query plan, the optimizer generating a different query plan for the query in an absence of the hint for the query, a first quantity of time required to execute the query plan being less than a second quantity of time required to execute the different query plan,
      storing, in a query plan cache, the query plan, and
      binding the query and the hint at least by storing, in a persistent table at the database, a mapping between the query and the hint, the storage of the mapping in the persistent table preserving the binding between the query and the hint through a restart, an update, and/or a failure at the database;
   in response to the restart, the update, and/or the failure at the database, restoring, based at least on the persistent table, the query plan cache at least by recompiling the query plan, the query plan being recompiled by at least reusing, based at least on the mapping stored in the persistent table, the hint bound to the query; and
   in response to receiving a same query, executing, based at least on the query plan stored in the query plan cache, the same query at the database without the optimizer having to compile the same query.

2. The method of claim 1, wherein storing the query plan includes replacing the different query plan stored in the query plan cache, and wherein the different query plan is generated by the optimizer without the hint for the query.

3. The method of claim 1, wherein the query is decoupled from the database.

4. The method of claim 1, wherein the query plan executes within a threshold quantity of time, and wherein the different query plan does not execute within the threshold quantity of time.

5. The method of claim 1, wherein the receiving, the associating, the compiling, and the executing are implemented by one or more data processors distributed among one or more computing systems.

6. A system, comprising:
   at least one data processor; and
   at least one memory storing instructions, which when executed by the at least one data processor, result in operations comprising:
      determining, by an optimizer, that a hint is available for a query received from an application, the hint modifying an execution time of the query at a database by at least reducing a quantity of time required to execute the query;
      in response to the determination that the hint is available for the query:
         compiling, by the optimizer, the query in accordance with the hint to generate a query plan, the optimizer generating a different query plan for the query in an absence of the hint for the query, a first quantity of time required to execute the query plan being less than a second quantity of time required to execute the different query plan,
         storing, in a query plan cache, the query plan, and
         binding the query and the hint at least by storing, in a persistent table at the database, a mapping between the query and the hint, the storage of the mapping in the persistent table preserving the binding between the query and the hint through a restart, an update, and/or a failure at the database;
      in response to the restart, the update, and/or the failure at the database, restoring, based at least on the persistent table, the query plan cache at least by recompiling the query plan, the query plan being recompiled by at least reusing, based at least on the mapping stored in the persistent table, the hint bound to the query; and
      in response to receiving a same query, executing, based at least on the query plan stored in the query plan cache, the same query at the database without the optimizer having to compile the same query.

7. The system of claim 6, wherein storing, the query plan includes replacing the different query plan stored in the query plan cache, and wherein the different query plan is generated by the optimizer without the hint for the query.

8. The system of claim 6, wherein the query is decoupled from the database.

9. The system of claim 6, wherein the query plan executes within a threshold quantity of time, and wherein the different query plan does not execute within the threshold quantity of time.

10. A non-transitory computer readable medium storing instructions, which when executed by at least one processor, cause operations comprising:

determining, by an optimizer, that a hint is available for a query received from an application, the hint modifying an execution time of the query at a database by at least reducing a quantity of time required to execute the query;

in response to the determination that the hint is available for the query:

compiling, by the optimizer, the query in accordance with the hint to generate a query plan, the optimizer generating a different query plan for the query in an absence of the hint for the query, a first quantity of time required to execute the query plan being less than a second quantity of time required to execute the different query plan,         storing, in a query plan cache, the query plan, and         binding the query and the hint at least by storing, in a persistent table at the database, a mapping between the query and the hint, the storage of the mapping in the persistent table preserving the binding between the query and the hint through a restart, an update, and/or a failure at the database;

in response to the restart, the update, and/or the failure at the database, restoring, based at least on the persistent table, the query plan cache at least by recompiling the query plan, the query plan being recompiled by at least reusing, based at least on the mapping stored in the persistent table, the hint bound to the query; and     in response to receiving a same query, executing, based at least on the query plan stored in the query plan cache, the same query at the database without the optimizer having to compile the same query.

11. The non-transitory computer readable medium of claim 10, wherein storing the query plan includes replacing the different query plan stored in the query plan cache, and wherein the different query plan is generated by the optimizer without the hint for the query.

12. The non-transitory computer readable medium of claim 10, wherein the query is decoupled from the database.

13. The non-transitory computer readable medium of claim 10, wherein the query plan executes within a threshold quantity of time, and wherein the different query plan does not execute within the threshold quantity of time.

\* \* \* \* \*